United States Patent
Clark et al.

(10) Patent No.: US 7,226,163 B2
(45) Date of Patent: Jun. 5, 2007

(54) METHODS FOR DESIGNING TINTED CONTACT LENSES

(75) Inventors: Douglas G. Clark, Jacksonville, FL (US); Khaled Chehab, Jacksonville, FL (US); Russell Spaulding, Jacksonville, FL (US); Kevin Kearney, Fairport, NY (US); Joanne Gosselin, Webster, NH (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/890,787

(22) Filed: Jul. 14, 2004

(65) Prior Publication Data
US 2005/0041204 A1 Feb. 24, 2005

Related U.S. Application Data

(60) Provisional application No. 60/491,739, filed on Aug. 1, 2003.

(51) Int. Cl.
*G02C 7/04* (2006.01)
(52) U.S. Cl. .................... 351/177; 351/160 R
(58) Field of Classification Search ........... 351/177, 351/178, 160 R, 247
See application file for complete search history.

(56) References Cited

U.S. PATENT DOCUMENTS

| | | | |
|---|---|---|---|
| 6,655,804 B2 * | 12/2003 | Streibig | 351/177 |
| 6,746,120 B2 * | 6/2004 | Broderick et al. | 351/177 |
| 6,902,273 B2 * | 6/2005 | Suzaki et al. | 351/177 |

FOREIGN PATENT DOCUMENTS

| | | |
|---|---|---|
| WO | WO 01/96934 A2 | 12/2001 |
| WO | WO 02/23254 A1 | 3/2002 |
| WO | WO 02/37170 A2 | 5/2002 |

OTHER PUBLICATIONS

PCT International Search Report, dated Nov. 29, 2004, for PCT Int'l. Appln. No. PCT/US2004/023907.

* cited by examiner

*Primary Examiner*—Scott J. Sugarman
*Assistant Examiner*—Darryl J. Collins
(74) *Attorney, Agent, or Firm*—Lois Gianneschi

(57) ABSTRACT

The invention provides a method for designing tinted contact lenses that permits the computer-assisted modeling of a tinted lens on-eye. The method of the invention provides a substantially accurate prediction as to the appearance of the lens on-eye and reduces the number of designs that must be clinically tested and the number of iterations that each design must go through.

16 Claims, 1 Drawing Sheet

METHODS FOR DESIGNING TINTED CONTACT LENSES

This application is the non-provisional filing of provisional application U.S. Ser. No. 60/491,739 filed on Aug. 1, 2003.

FIELD OF THE INVENTION

The invention relates to methods for designing tinted contact lenses. In particular, the invention provides a method for evaluating tinted contact lens designs without having to place the lenses on-eye.

BACKGROUND OF THE INVENTION

The use of tinted, or colored, contact lenses that incorporate iris patterns to alter the natural color of the iris is well known. Typically, the patterns used in the tinted lenses are derived from artistic renderings of human iris patterns. The disadvantage of this design method is that the patterns, and colors used in the patterns, are not created with sufficient consideration for the interaction of the spectral and optical characteristics of the patterns when the lenses are on-eye. These optical characteristics include, without limitation, reflections, metamerism, and color summations such as the cumulative appearance of placing a transparent or translucent color over another color. Thus, the on-eye appearance of the lens' iris pattern is unpredictable as to both the geometric appearance and the blending of the colors with the eye's natural iris colors. In order to obtain a desirable design, many iterations of a design may need to be tested on-eye. Therefore, a need exists for a method of designing tinted lenses that overcome this disadvantage.

DETAILED DESCRIPTION OF THE INVENTION AND PREFERRED EMBODIMENTS

Figure 1:
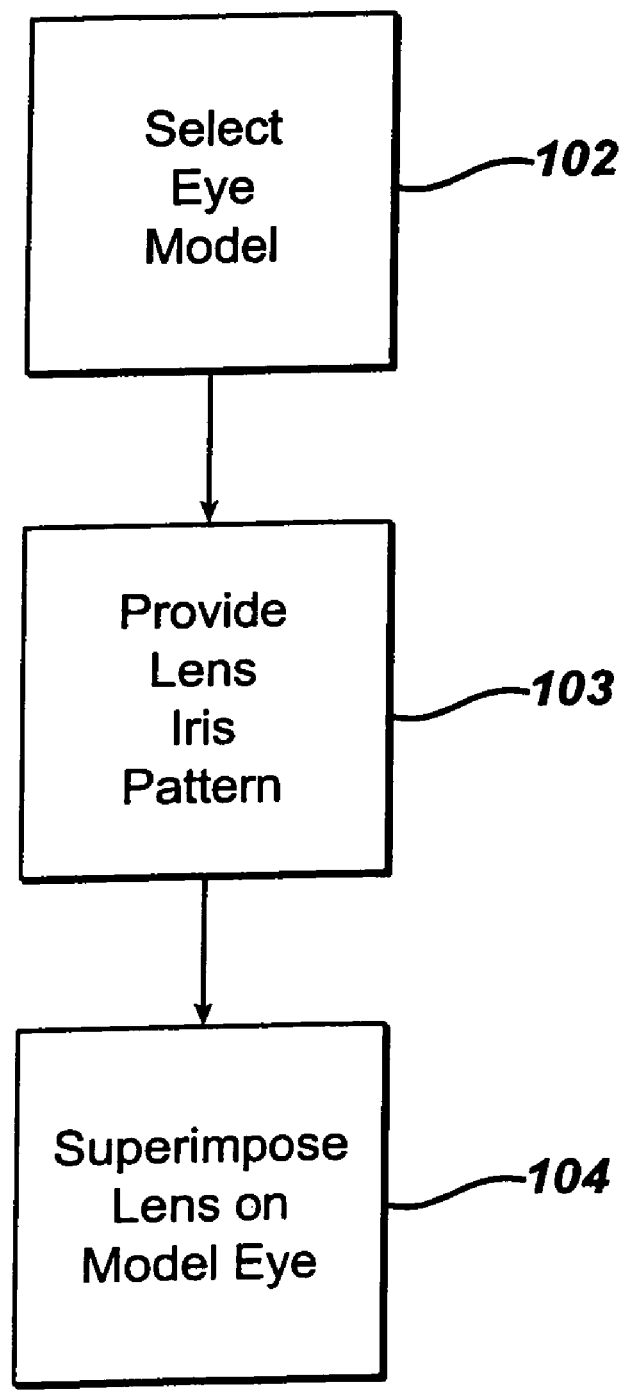
FIG. 1 is a flow chart of one embodiment of the method of the invention.

The invention provides a method for designing tinted contact lenses, methods for their manufacture, and lenses made by the method. The method of the invention permits the computer-assisted modeling of a tinted lens on-eye. The method of the invention provides a substantially accurate prediction as to the appearance of the lens on-eye. By "substantially accurate" is meant that the accuracy is sufficient to predict the appearance of the lens on-eye as if the lens actually had been placed on-eye for evaluation. Thus, the method reduces the number of designs that must be clinically tested and the number of iterations that each design must go through.

The method of the invention provides for two-dimensional or three-dimensional images to be used in a three-dimensional graphics arts software program to provide a display of a model eye with a tinted contact lens overlaying the model eye at given illumination and observation conditions. In one embodiment, the invention provides a method for designing a tinted contact lens comprising, consisting essentially of, and consisting of: a.) selecting a model eye image comprising an iris; b.) providing a computer-generated contact lens comprising an iris pattern; c.) superimposing the contact lens on the model eye so that the iris pattern is superimposed on the iris of the eye; and d.) applying a means for simulating the interaction of light passing through the iris and the iris pattern. In another embodiment, the method further comprises the step of modifying one or more of lighting type, or spectra, lighting level, lighting direction, and observer angle.

The method of the invention may be used by tinted contact lens designers and eye care practitioners, but will provide particular utility for the contact lens designer. For purposes of selecting parameters for carrying out of each step of the method of the invention, the user may use any convenient input device including, without limitation, a keyboard, a scanning device, a mouse, a touch-pad or touch-screen or the like or a combination thereof. In a preferred embodiment, the user may create a tinted contact lens with a specific iris pattern and view it on-eye under a variety of illumination and observation conditions.

Useful hardware for carrying out the method of the invention includes any commercially available personal computer, including any MACINTOSH™, WINDOWS™, or UNIX™ based computer or the like that has video graphics capability. A color-calibrated monitor is required. Calibration may be provided by commercially available software such as Monaco EZ COLOR™.

FIG. 1 is a flow diagram of the method of the invention. In the first step 102 of the method of the invention, a model eye image is selected by the user from a library of stored eye images. The images stored may be obtained from any convenient means such as digital photographs or scanned images of eyes, artistic renderings of eyes, or combinations thereof. Preferably, photographs or scanned images of eyes are used. The eye structures including, without limitation, the globe, sclera, cornea, iris and pupil are provided, preferably along with extra-ocular facial features including, without limitation, lashes, brows, skin tone and the like. These various structures and features are selected and applied as separate layers. Suitable software for use in carrying out this step is commercially available, such as 3DS MAX™, MAYA™, LIGHTWAVE™, and the like.

In the second step 103 of the method of the invention, a contact lens having an iris pattern is provided. The contact lens is specified in a three-dimensional model as a spherical shell of multiple layers. The refractive index of each of the layers may be defined numerically to simulate the refractive index of the lens material of interest. Other lens parameters specified may include, without limitation, geometric shape, such as spheric or toric, lens material, thickness, diameter, and the like.

The parameters of the iris pattern of the lens are selected by the user and include color, including, without limitation hue, saturation, and chroma, pattern, opacity level, pattern area coverage, and the like. The color may be selected from a palette of colors preferably using a RGB (red, green, blue) color system. The pattern may selected from by the user from a pattern library that includes a wide variety of individual components that can be used in a pattern. Pattern components may be any geometric shape or free-hand drawn components including, without limitation, dots, striae, feather-like shapes, lines and the like.

Opacity level is selected by the user taking into consideration the model eye the pattern is to be placed upon, the nature of the pattern itself, and the desired result of the iris-pattern combination. In addition to opacity level, pattern coverage is also selected by the user. The pattern coverage defines the outer and inner diameter of the area of the lens in which the pattern is located. Typically, this area will have an inner diameter of about 4.0 mm to about 6.0 mm and an outer diameter of 10.0 mm to about 14.0 mm.

The iris pattern may be composed in, and exported to, an image file Using any suitable software. For example, the pattern may be rendered in either a bitmap program, such as ADOBE PHOTOSHOP™, or a vector-based program, such as CORELDRAW™, along with any number of other commercially available programs. The iris pattern may then be exported to and stored in a suitable image file including, without limitation a JPEG, BMP, PSD, TIFF, TGA or other suitable file format. Alternatively, the iris pattern may be created directly in the three dimensional graphics art software used to model the appearance of the tinted contact lens on the model eye The rendered iris pattern is displayed on any suitable display means. Suitable display means include, without limitation, a cathode ray tube monitor, a liquid crystal monitor, or the like. The display preferably has a magnification of at least 2048×1536 pixels.

In step 104, the contact lens is then superimposed on the model eye so that the iris pattern of the lens is superimposed on the iris of the model eye. The user applies the individual layers of the pattern or a composite image of the pattern to the model eye, while manipulating the layers or composite image for color and opacity level. The pattern or image is mapped, meaning placed in a specific location in three-dimensional space, so that it aligns with the model eye in x and y rectangular coordinates. By additionally specifying the z coordinate, the pattern may be positioned at any desired spatial distance from the iris of the model eye.

Once the model eye-contact lens system is displayed, the interaction of light passing through the iris and the iris pattern may be simulated. The graphics art program, such as the 3DS MAX program, may be used to provide several methods for simulating the result of light passing through the various layers of the colored contact lens and the associated layers of the model eye. A preferred method of simulation is ray-tracing. In simulating the passage of light, the geometries and indices of refracting of the various elements of the pattern and eye model are considered as well as that of the materials, colors and opacity levels assigned thereto. By user manipulation of each variable, the resulting image of the pattern provides a substantially accurate representation of the on-eye appearance of the lens.

In an optional step of the method of the invention, the lighting spectra level and direction as well as observer viewing angle may be varied by using suitable software including, without limitation, 3DS MAX, MAYA, or LIGHTWAVE. This enables the appearance of the lens on the model eye to be simulated under a variety of luminance levels and lighting types, such as daylight, fluorescent, mercury, or the like. The lighting direction may be varied to simulate the change in iris color imparted by the tinted lens pattern under one or both of differing illumination conditions and lighting angles. This capability enables optimization of the color and opacity levels of the composite image or of each layer of a pattern either for a specific lighting condition or an average of many varied lighting conditions.

The invention may be used to provide tinted hard or soft contact lenses made of any known lens-forming material, or material suitable for manufacturing such lenses. Preferably, the lenses of the invention are soft contact lenses and the material selected for forming the lenses of the invention being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes and mixtures thereof, silicone hydrogel or a hydrogel, made of monomers containing hydroxy groups, carboxyl groups, or both or be made from silicone-containing polymers, such as siloxanes, hydrogels, silicone hydrogels, and combinations thereof. Materials for making soft contact lenses are well known and commercially available. Preferably, the material is acquafilcon, etafilcon, galyfilcon, genfilcon, or lenefilcon.

What is claimed is:

1. A method, comprising: a.) providing a model eye image comprising an iris; b.) providing a computer-generated contact lens comprising an iris pattern; c.) superimposing the contact lens on the model eye so that the iris pattern is superimposed on the iris of the eye; and d.) applying a means for simulating the interaction of light passing through the iris and the iris pattern to provide a substantially accurate prediction of on-eye appearance of the lens.

2. The method of claim 1, further comprising the step of modifying one or more of a lighting type, spectra, lighting level, lighting direction, or observer angle.

3. The method of claim 1, wherein the model eye is selected from digital photographs of eyes, scanned images of eyes, or artistic renderings of eyes.

4. The method of claim 1, wherein the model eye is selected from photographs or scanned images of eyes.

5. The method of claim 2, wherein the model eye is selected from digital photographs of eyes, scanned images of eyes, or artistic renderings of eyes.

6. The method of claim 2, wherein the model eye is selected from photographs or scanned images of eyes.

7. The method of claim 1, further comprising selecting one or more parameters for the iris pattern from the group consisting of hue, saturation, chroma, pattern, opacity level, and pattern area coverage.

8. The method of claim 2, further comprising selecting one or more parameters for the iris pattern from the group consisting of hue, saturation, chroma, pattern, opacity level, and pattern area coverage.

9. The method of claim 1, wherein the model eye further comprises a globe, sclera, cornea, and pupil.

10. The method of claim 2, wherein the model eye further comprises a globe, sclera, cornea, and pupil.

11. The method of claim 9, wherein the model eye further comprises one or more extra-ocular features.

12. The method of claim 10, wherein the model eye further comprises one or more extra-ocular features.

13. The method of claim 9, further comprising selecting one or more parameters for the iris pattern from the group consisting of hue, saturation, chroma, pattern, opacity level, and pattern area coverage.

14. The method of claim 10, further comprising selecting one or more parameters for the iris pattern from the group consisting of hue, saturation, chroma, pattern, opacity level, and pattern area coverage.

15. The method of claim 11, further comprising selecting one or more parameters for the iris pattern from the group consisting of hue, saturation, chroma, pattern, opacity level, and pattern area coverage.

16. The method of claim 12, further comprising selecting one or more parameters for the iris pattern from the group consisting of hue, saturation, chroma, pattern, opacity level, and pattern area coverage.

* * * * *